April 18, 1967 D. R. REECE ET AL 3,314,281
GAS ANALYZING METHOD AND APPARATUS
Filed June 1, 1965 2 Sheets-Sheet 1

DAN R. REECE
HENRY L. BURNS
INVENTORS

BY
BUCKHORN, BLORE, KLARQUIST & SPARKMAN
ATTORNEYS

April 18, 1967  D. R. REECE ET AL  3,314,281
GAS ANALYZING METHOD AND APPARATUS
Filed June 1, 1965                                           2 Sheets-Sheet 2

DAN R. REECE
HENRY L. BURNS
INVENTORS
BY
BUCKHORN, BLORE, KLARQUIST & SPARKMAN
ATTORNEYS

United States Patent Office 3,314,281
Patented Apr. 18, 1967

3,314,281
GAS ANALYZING METHOD AND APPARATUS
Dan R. Reece, 10111 SW. 57th Ave., Portland, Oreg. 97219, and Henry L. Burns, Beaverton, Oreg.; said Burns assignor to said Reece
Filed June 1, 1965, Ser. No. 460,410
10 Claims. (Cl. 73—23)

This application is a continuation-in-part of our co-pending application, Serial No. 304,513, filed Aug. 26, 1963.

The present invention relates to novel methods and apparatus for analyzing mixtures of gases and more particularly to a continuously monitoring device for determining variations in the concentration of a gas in a mixture of gases.

In many environments it is desirable to continually monitor a mixture of gases to determine the variance therein of the concentration of a component either to observe the variance or to apply a control so as to maintain the component concentration within certain limits. For example, in both biological tissue culture and fresh fruit storage it is desired to maintain the carbon dioxide content of the atmosphere within closely controlled limits. In metabolism studies it is desired to monitor the breath of a patient to determine the variations in carbon dioxide content. Numerous other instances could be given where it is desired to determine the carbon dioxide content of air or the concentration of some other gas in a mixture and wherein the present invention could be utilized.

In our prior application identified above there is illustrated a device for indicating variations in the concentration of a gas in a mixture of gases, particularly of carbon dioxide in air, and which device is capable of continually monitoring the mixture and giving a substantially instantaneous indication of a gas concentration. However, such prior device is sensitive to changes in the pressure in the ambient atmosphere and has certain other disadvantages.

It is, therefore, an object of the present invention to provide a new and improved gas analyzing apparatus and method that is insensitive to changes in the pressure in the ambient atmosphere in which the apparatus is utilized.

Still another object of the invention is to provide a new and improved gas analyzing apparatus of simplified construction.

Another object of the invention is to provide a new and improved apparatus for indicating the absolute concentration of carbon dioxide in a mixture of carbon dioxide with other gases.

Still another object of the invention is to provide a new and improved apparatus for indicating the concentration of carbon dioxide in a mixture of gases and which is substantially insensitive to the concentration of water vapor in such gases.

Another object is to provide a carbon dioxide analyzer that is self-compensating for temperature changes over a reasonable range of temperature.

Other objects and advantages of the present invention will become more apparent hereinafter.

In accordance with an illustrated embodiment in the present invention a supply of air containing carbon dioxide, the concentration of which it is desired to determine, is fed under predetermined pressure to a turbulent flow orifice and thence through a laminar flow orifice at the discharge end of which a constant predetermined pressure is maintained. The pressures at the outlet of the laminar flow orifice, between the laminar flow orifice and the turbulent flow orifice, and at the entrance of the turbulent flow orifice are continuously monitored and applied to a servo mechanism which is adapted to control an infeed valve in the supply of gas being monitored so as to adjust the pressure at the inlet of the turbulent orifice to maintain such uniform flow rate. The pressure at the inlet of such turbulent flow orifice is continually monitored and compared with a reference pressure to give a direct indication of the concentration of the carbon dioxide in the mixture being passed through the device.

For a more detailed description of the invention reference is made to the accompanying drawings wherein.

The method and apparatus of the present invention can be adapted to detect the variance of any gas in a mixture of gases wherein such gas has different flow characteristics from the other gases in one orifice as compared to the flow characteristics through another orifice. The invention has particular utility in monitoring gases for changes in the concentration of carbon dioxide therein and will be described with reference to such use, but it is to be understood that it is not limited thereto.

It will be appreciated that gaseous substances have different flow characteristics through an orifice and the flow characteristics through various orifices differ. It is upon these differences that the present invention depends. In particular, the present invention relies upon the differences in flow characteristics of gases through laminar flow orifices on the one hand and turbulent flow orifices on the other hand.

Figure 1:
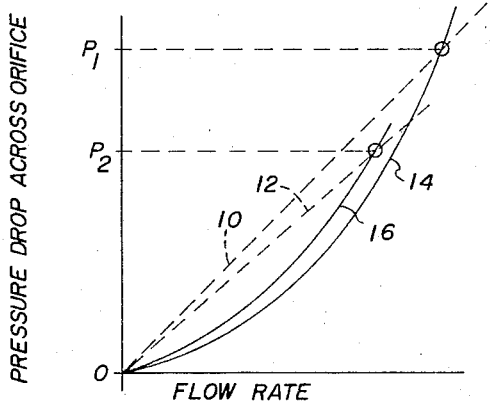
FIG. 1 is a graph of the flow rate-pressure drop relationship of certain gas mixtures across a laminar flow orifice and a turbulent flow orifice.

Referring to FIG. 1, the relationship between the pressure drop across a laminar flow orifice and the flow rate through such orifice is a straight line function. The pressure drop-flow relationship of air free of carbon dioxide, and having otherwise normal composition, through a typical laminar flow orifice is, for example, indicated by the dotted line 10. However, the addition of carbon dioxide to air will cause a change in the pressure drop-flow relationship through such an orifice. While it is a straight-line relationship, it assumes a different angle as indicated by the dotted line 12.

On the other hand, the pressure drop-flow relationship of a gaseous substance through a turbulent orifice is an exponential relationship. The pressure drop-flow relationship of air of normal composition, but free of carbon dioxide, through a typical turbulent flow orifice is represented by the solid curved line 14. However, the addition of carbon dioxide to the air will change such relationship so that the plot thereof assumes a shape such as indicated at 16. It will be apparent that for the orifices whose curves are represented in FIG. 1, the flow through the laminar flow orifice and the turbulent orifice would be equal for air free of carbon dioxide only when the pressure drop across both orifices is equal to the pressure $P_1$. Likewise with an air-carbon dioxide mixture the flow rate through such orifices will be equal only when the pressure drop across such orifices is at the lower pressure $P_2$. Thus, if a sample of air free of carbon dioxide is passed in series through a laminar flow orifice and a turbulent flow orifice having the graphed characteristics at the same flow rate, the pressure drops across such orifices will be equal to the pressure $P_1$. In the event that carbon dioxide is introduced into the air sample then the pressure drop across each of the two orifices must be changed to equal the pressure $P_2$ in order that the flow rates across such orifices will remain equal. The use of these functions in the method and apparatus of the invention will become clear hereinafter. It will be understood that in referring to flow rate herein reference is to mass flow.

Figure 2:
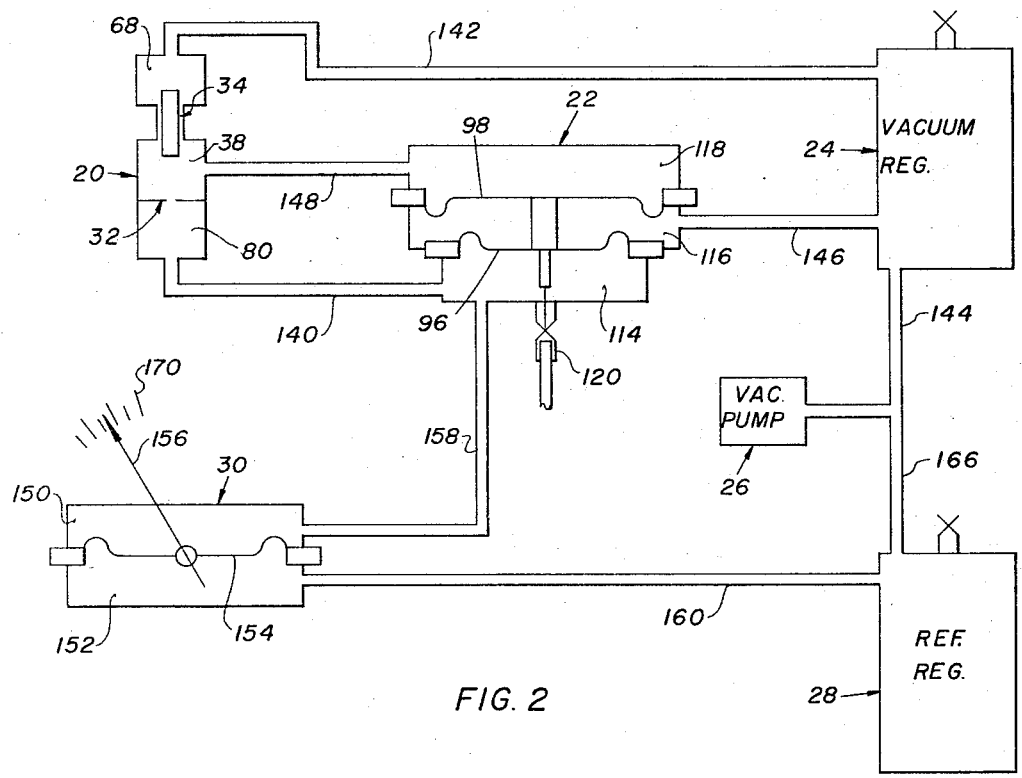
FIG. 2 is a schematic flow diagram of apparatus embodying the invention herein.

Referring now to FIG. 2, the presently illustrated embodiment of the invention utilizes a sensing cell 20, a servo regulator 22, a vacuum regulator 24, a vacuum pump 26, a reference regulator 28 and a readout device 30. The sensing cell 20 comprises a turbulent flow orifice means 32 and a laminar flow orifice means 34 through which the gas sample to be monitored is passed in series.

Figure 3:
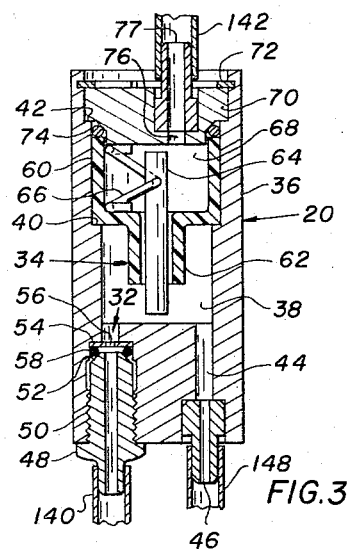
FIG. 3 is a sectional view of a portion of the apparatus of the invention.

Referring to FIG. 3, there is therein shown the actual construction of a suitable sensing cell 20 which includes a tubular body 36 recessed from one end thereof to provide an elongate chamber having two counterbores defining shoulders 40, 42 in the side walls of the chamber. An opening 44 is provided in the lower portion of the body 36 as it is shown in FIG. 3 for the purpose of connecting a pressure monitoring device to such chamber. A connector 46 may be provided for that purpose. Also provided in the body member 36 is a sample inlet comprising a nipple 48 threaded into a cooperatively threaded opening 50 formed with a shoulder 52 against which is clamped a turbulent flow orifice defining member 32 in the form of a disc having a small aperture 56 through the center thereof. The disc 32 is clamped by means of a resilient bushing 58 positioned between the disc and the end of the nipple 48.

Laminar flow orifice defining means 34 is provided in the sensing cell 20 and which means is defined by a cup shaped member including an upper portion 60 of relatively large diameter seated against the shoulder 40 to define beneath the cup a chamber 38 and a sleeve portion 62 extending downwardly into such chamber from the upper portion 60. Mounted within the sleeve portion 62 is a stem element 64 held in position by means of a spring 66. Preferably the cup member 60, 62 is formed of a plastic such as Delrin, or other material having a higher coefficient of expansion than the stem 64, and the stem 64 of metal such as stainless steel for purposes to be explained subsequently. The upper portion of the cup defines a chamber 68 which is closed by a closure member 70 seated against the counterbore shoulder 42 and held in place by a snap ring 72. A gasket 74 is positioned between the closure member 70 and the upper edge of the cup portion 60. A gas outlet 76 is provided through the cap member 70 from the chamber 68 and which outlet may be formed with a nipple 77 permitting a connection to be made thereto. It will be noted that in a sense, and, as shown diagrammatically in FIG. 2, the sensing cell 20 comprises three chambers separated by the orifices 32, 34, one chamber being defined by the conduit system upstream from the turbulent orifice and indicated at 80 in FIG. 2, the other chambers being the chambers 38, 68.

The turbulent flow orifice 32 and the laminar flow orifice elements preferably are designed so as to have substantially the same pressure drop there across for equal flow rates of the gas mixture to be analyzed. In an air-carbon dioxide analyzing embodiment the orifice plate 32 is formed of a metal plate of about 0.006 inch thickness with an aperture formed by a No. 80 drill, that is, having a diameter of about 0.012 inch. The laminar flow orifice is formed by a sleeve 62 having an inner diameter of 0.1250 inch and the stem 64 is formed of a cylindrical pin having a diameter of 0.1210 inch. The sleeve 62 has a length of about one half inch.

Figure 4:
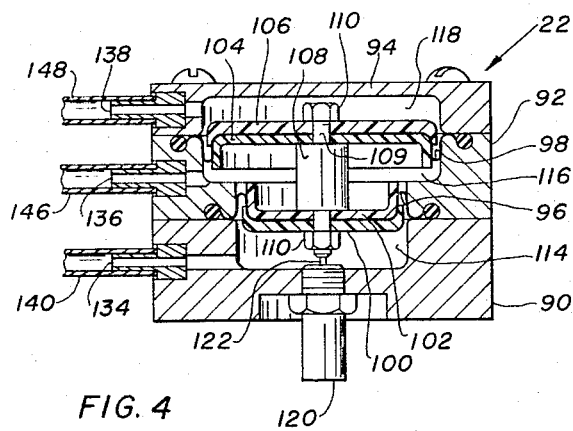
FIG. 4 is a sectional view of another portion of the apparatus of the invention.

Referring now more particularly to FIG. 4, the servo regulator 22 comprises a housing structure including a base 90, an annular intermediate member 92 and a cover portion 94. A flexible diaphragm 96 is clamped between the base 90 and the member 92 and another flexible diaphragm 98 is clamped between the member 92 and the cover 94. The center portion of the diaphragm 96 is clamped between a pair of cup shaped rigid elements 100, 102. Similarly, the diaphragm 98 is clamped at its center portion between rigid cup like members 104, 106. For purposes to be made more apparent, the diaphragm 98 has an effective area about twice that of the diaphragm 96. The center portions of the diaphragms are rigidly connected together by a spacer member 108 having threaded studs 109 extending outwardly from the opposite ends thereof on which are engaged nuts 110. The diaphragms 96, 98 divide the servo mechanism into three chambers, including a lower chamber 114, a central chamber 116 and a top chamber 118.

An inlet element 120 is provided to the chamber 114 and which inlet element is provided with a regulating control valve of any suitable type and having a control element or stem 122 for operative engagement with the diaphragms 96, 98. In the embodiment of the invention shown the valve 120 is of the type such that upon movement of the stem 122 downwardly, as the diaphragm is shown, the rate of flow of gas through the control valve is increased and upon upward movement the flow rate decreases. Each of the chambers 114, 116, 118 is also provided with an outlet shown at 134, 136 and 138 respectively. The outlet 134 is connected by a conduit 140 to the nipple 48 of the sensing cell, the outlet 136 is connected by a conduit 146 to the vacuum regulator 24, and the outlet 138 is connected by a conduit 148 to the connector 46 of the sensing cell.

The vacuum regulator 24 is arranged to maintain a predetermined constant pressure within the chambers 68 and 116. In the embodiment of the invention presently described such pressure preferably is between about 4 and 6 pounds per square inch absolute. The vacuum regulator 24 is connected by a line 144 to the vacuum pump 26.

As will be apparent, during operation of the device the chamber 118 of the servo regulator will have the same pressure as that in the chamber 38, the chamber 116 will have the same pressure as that in the chamber 68, and the chamber 114 will have the same pressure as that of the chamber 80 on the upstream side of the turbulent flow orifice 32.

The read-out device 30 is arranged to sense the pressure in the chamber 114 which is, of course, the pressure on the upstream side of the turbulent flow orifice 32. This is compared against a reference pressure maintained at a steady state at something less than normal atmospheric variations so that an absolute read-out may be given. In the illustrated embodiment of the invention the read-out device 30 comprises a diaphragm type indicator including a chamber 150 and a chamber 152 separated by flexible diaphragm 154 arranged to move an indicating needle 156 or the like. The chamber 150 is connected to the chamber 114 of the servo mechanism through a line 158 so that the pressure in the chamber 150 will be identical to that in the chamber 114, and the chamber 152 is connected through a line 160 to the reference regulator 28 connected to the vacuum pump 26 through a line 166 and arranged to maintain a uniform pressure in the chamber 152 of between about 9 to 11 pounds per square inch absolute.

The vacuum regulator 24 and reference regulator 28 are conventional types and capable of controlling gaseous atmospheres within the accuracy required of the occasion.

The operation of the apparatus above described is as follows: A sample of air is bled through the valve 120 to the chamber 114 from which it flows through the line 140, thence through the turbulent flow orifice 32 and laminar flow orifice 34, and to the vacuum regulator 24. The diaphragms 96, 98 of the servo regulator will adjust until an equilibrium condition is reached and gas is flowing through the valve 120 at a stable rate of flow.

Referring to FIG. 1, such steady state is reached at the cross-over points of curves 10, 14 where the pressure drops across the orifices 34, 32 will be equal to one another. After the system reaches equilibrium the indication of the read-out device 30 will give a reference basis for further operations of the device.

If next an air sample containing carbon dioxide is passed into the flow system, and referring to FIG. 1, the first effect will be for the flow rate through the turbulent orifice to decrease. It will be noted from the curves 14, 16 that for the same pressure difference across a turbulent orifice, air containing carbon dioxide has a lower flow rate than air free of carbon dioxide. On the other hand, the air containing carbon dioxide has a faster flow rate through the laminar flow orifice 34 for the same pressure drop as may be seen from lines 10, 12. Consequently, the effect of adding carbon dioxide to the sample will reduce the pressure in the chamber 38 likewise reducing the pressure in the chamber 118 of the servo regulator. This will cause the diaphragms 96, 98 to move upwardly whereupon the valve 120 will begin to close restricting the rate of flow of gas into the chamber 114. This will decrease the flow rate through the turbulent orifice 32 decreasing the pressure in the chamber 38 still more but which in turn will decrease the flow rate through the laminar flow orifice 34. The servo mechanism will hunt until finally a new equilibrium condition is established wherein the flow rates through the orifices 32, 34 are equal and which will be the cross over points of the curves 12, 16 as they are shown in FIG. 1.

The equilibrium pressure finally established in the chamber 114 will, of course, be transmitted to the readout device 30 giving a new indication by the indicator 156. A suitable calibrated scale 170 is provided on the readout device to give a direct reading of the percentage of carbon dioxide in the air being sampled.

A significant advantage of the system of the invention is that since the pressures in the sensing cell are being balanced against absolute reference pressures the system will be insensitive to changes in atmospheric pressure caused either by changes in the ambient barometric pressure or by changes in altitude during the period of use of the instrument.

A further significant advantage of the system of the invention for measuring carbon dioxide is that it is substantially insensitive to variations in the humidity in the sample being tested. An increase in the percentage of water vapor in an air sample will decrease the viscosity. The laminar flow orifice 34 is viscosity sensitive and the decrease in the viscosity due to the presence of water vapor in the air will increase the flow rate through the laminar flow orifice. On the other hand an increase in the percentage of water vapor in the air decreases the density thereof, and since flow through the turbulent orifice 32 is density sensitive the decrease in density will tend to increase the flow rate through such orifice. The relative increases are substantially identical and thus the presence of water vapor is automatically cancelled out. Accordingly, it is not necessary to remove water vapor from the sample before testing the same and this, of course, has numerous advantages.

The device of the invention is also tolerant of temperature changes by reason of the construction of the laminar flow orifice of two different materials. For example, a sensing element made as specified has a temperature tolerance of approximately 5° Fahrenheit in determining carbon dioxide concentration in air within one-quarter of one percent. Should the temperature of a gas sample vary more than by this amount during the testing of the same the device can be recalibrated. The adjustment for temperature variations occurs as follows: Assuming a gas of constant composition, an increase in temperature will cause an increase in viscosity but a decrease in density. Without other changes this would cause an increase in flow rate across the turbulent flow orifice 32 and a decrease in the flow rate through the laminar flow orifice 34. However, the Delrin sleeve 62 has a higher coefficient of expansion than the stem 64 so that the higher gas temperature heating such parts causes the laminar flow orifice defined between such members to enlarge thus allowing the flow rate through such orifice to increase. Such increase is, for temperature differences of about 5° Fahrenheit at least, substantially equal to the increase in flow rate through the turbulent flow orifice 32 and the device remains substantially stable. A decrease in temperature has, of course, the reverse effect.

An anomaly of carbon dioxide also is of significance in rendering the method and apparatus of the invention particularly useful in analyzing air samples for the carbon dioxide concentration therein. This anomaly causes the system of the invention to have substantially greater sensitivity to a change in carbon dioxide concentration than to a change in the concentration of the gases generally found in an air sample. A change in oxygen concentration, for example, will have substantially less affect upon the readout signal obtained from the apparatus than will a change of equal amount in the carbon dioxide concentration. Accordingly, the changes in the composition of components other than carbon dioxide will ordinarily not have sufficient affect as to warrant monitoring during the testing of a sample. The anomaly to which reference has been made is the low viscosity which carbon dioxide possesses relative to its relatively high molecular weight. In the instance of most gases found in air the relative viscosity is proportional to the molecular weight of the gaseous component, but this is not true of carbon dioxide. This is illustrated by Table I below.

TABLE I

| | Viscosity | Molecular No. | Molecular No., Viscosity |
|---|---|---|---|
| Carbon Dioxide | 1.01 | 44 | 43.5 |
| Oxygen | 1.41 | 32 | 22.7 |
| Nitrogen | 1.18 | 28 | 23.6 |
| Water Vapor | 0.68 | 18 | 26.5 |
| Air | 1.25 | 29 | 23.2 |

The flow of gas through a laminar flow orifice may be expressed by the following formula:

$$\text{Pressure Drop} = \frac{A(\text{viscosity})(\text{velocity})}{(\text{width of passageway})}$$

where A is a constant.

Since the flow rate of a gas through a laminar orifice is directly proportional to the viscosity of the gas it will be apparent that a change in the carbon dioxide concentration in air will have a much greater affect upon the flow rate through the laminar flow orifice 34 than would a change in concentration of any of the other normal components of air.

Similarly, flow through a turbulent orifice may be expressed by the following formula:

$$\text{Pressure Drop} = B(\text{density})(\text{velocity})^2$$

where B is a constant.

Accordingly, as noted from the above formula, since gas density is proportional to molecular weight and carbon dioxide has the highest density of all the components of air, a change in carbon dioxide concentration will also effect the greatest change in the flow rate through the turbulent flow orifice 32. Thus, a change in the pressure balance across the sensing cell will be substantially greater for a small change in the concentration of carbon dioxide than for the other normal constituents of air. However, in the absence of carbon dioxide the concentration of the other components of air can be measured relative to one another and it will be apparent that the device can be used with many gaseous mixtures to determine the concentration of one component relative to another.

While in the preferred embodiment of the invention as illustrated, the orifices 32, 34 are designed to have substantially identical pressure drops under the conditions of operation, other arrangements can be utilized and in which case, after approximate operating pressures are selected, the relative areas of the diaphragms should be appropriately adjusted in accordance with the formula $$\frac{A_1}{A_2} = \frac{(P_3 - P_1)}{(P_2 - P_1)}$$

where $A_1$ is the area of the diaphragm 98, $A_2$ is the area of the diaphragm 96, $P_3$ is the pressure upstream from the turbulent orifice 32 (the pressure in the chambers 114, 80), $P_2$ is the pressure between the turbulent orifice and the laminar flow orifice 34 (the pressure in the chambers 38, 118), and $P_1$ is the pressure downstream from the laminar orifice (the pressure in the chambers 68, 116).

Figure 5:
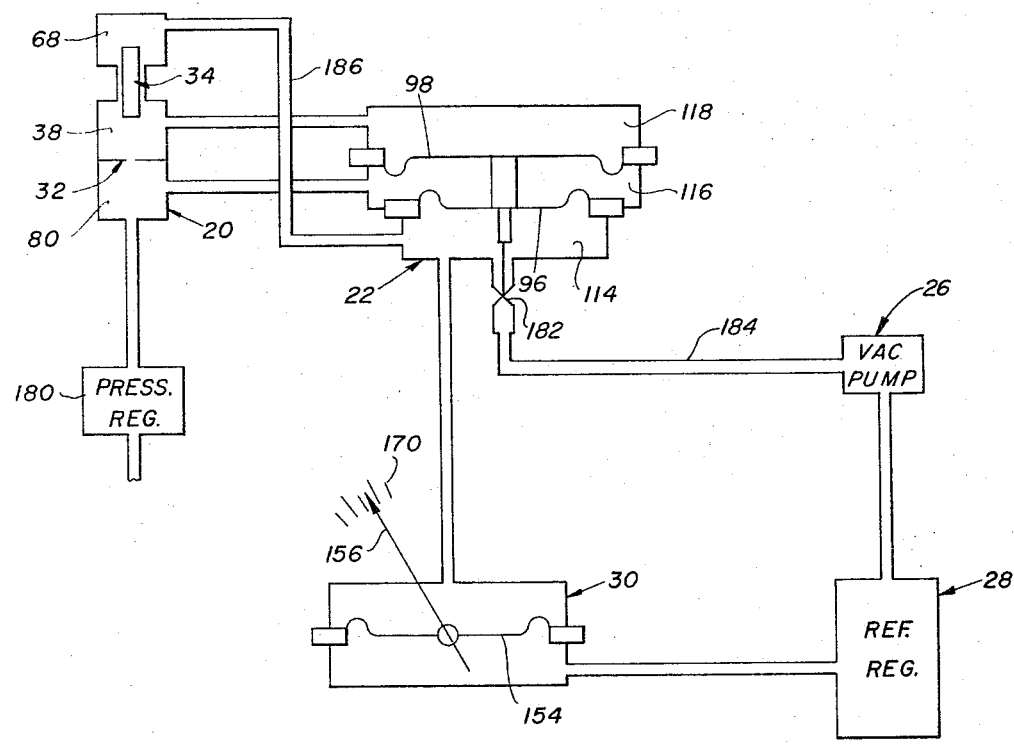
FIG. 5 is a schematic flow diagram of a further embodiment of the invention.

It will also be apparent that instead of regulating the pressure or rate of flow of the gas entering the sensing cell, gas may be fed to the sensing cell at a constant rate and constant pressure and the pressure downstream from the laminar orifice adjusted. A schematic arrangement of the sensing cell and servo mechanism for accomplishing such purpose is shown in FIG. 5. In such system a gas to be analyzed is passed into the sensing cell 20 by a constant pressure regulator 180. The gas discharging from the laminar flow orifice 34 is passed by a line 186 to the chamber 114 of the servo mechanism 22 which chamber is connected through a variable control valve 182 to the vacuum pump 26. As will be apparent, the pressure in the chamber 114 will be equal to that in the chamber 68 of the sensing cell. The chamber 116 is, in this case, connected to the chamber 80 of the sensing cell so that the pressure in the chamber 116 will be equal to the pressure upstream from the turbulent flow orifice 32. The chamber 118 of the servo mechanism is as before connected to the chamber 38 of the sensing cell. The diaphragms 96, 98 are rigidly connected together and are connected by an operating member 188 to the control valve 182 in such manner that upward movement of the operating member will cause a decrease in the flow of gas into the line 184.

This system will function in the following manner. Upon the introduction of a standard air sample through the sensing cell the system will reach equilibrium and the null point of the system can be noted on the readout scale 170. If a sample containing an additional amount of carbon dioxide is then passed through the sensing cell the sensing cell reacts as before. The pressure in the chamber 80 will remain constant by reason of the pressure regulator 180. However, the pressure in the chamber 38 will drop because of the compound effect of a decrease in the flow rate through the turbulent flow orifice 32 and an increase in the flow rate through the laminar flow orifice 34. Such flow will tend to increase the pressure in the chamber 68. The changes of pressures in the chambers 38, 68 will be reflected in the chambers 114, 118 causing upward movement of the valve operating member 188. This, in turn, will cause the valve 182 partially to close causing still further increase in pressure in the chamber 68 but which in turn will decrease the flow rate through the laminar flow orifice 34 so that the pressure in the chamber 38 will increase whereupon the system will eventually come to equilibrium. The increase in pressure in the chamber 114 is reflected by a change in the position of the indicator needle 156 of the readout device and the carbon dioxide concentration can then be noted on the calibrated scale 170.

It will be apparent that similar arrangements to those described above can be provided wherein the gases are passed first through a laminar flow orifice and thence through a turbulent flow orifice.

Having illustrated and described certain preferred embodiments of the invention it should be apparent that the invention permits of modification in arrangement and detail. We claim all such arrangements as come within the scope and purview of the appended claims.

We claim:

1. Apparatus for determining the concentration of one gas in a mixture of gases comprising:

means defining a path of flow for a sample of said gases,
  turbulent flow orifice means in said path of flow,
  laminar flow orifice means in said path of flow,
  flow regulating means for varying the rate of gas flow through said flow path,
  means for sensing the pressure drop across said laminar flow orifice means,
  means for sensing the pressure drop across said turbulent flow orifice means,
  means responsive to said sensing means and connected to said flow regulating means operative to effect adjustment of the latter means to maintain the flow rate through said flow path such that the pressure drops across said orifice means remain in predetermined ratio to one another,
  sensing means responsive to changes in the flow rate of said gases through said path of flow,
  and readout means responsive to said last mentioned means for providing a signal proportional to the flow rate of said gases in said path.

2. The apparatus of claim 1 wherein said orifices have substantially equal pressure drops.

3. Apparatus for determining the concentration of carbon dioxide in air containing the same comprising;

means defining a path of flow for a sample of air to be tested,
  turbulent flow orifice means in said path of flow,
  laminar flow orifice means in said path of flow,
  flow regulating means for varying the rate of air flow through said flow path,
  means for sensing the pressure drop across said laminar flow orifice means,
  means for sensing the pressure drop across said turbulent flow orifice means,
  means responsive to said sensing means and connected to said flow regulating means operative to effect adjustment of the latter means to maintain the flow rate through said flow path such that the pressure drops across said orifice means remain in predetermined ratio to one another,
  sensing means responsive to changes in the flow rate of air through said path of flow,
  and readout means responsive to said last mentioned means for providing a signal proportional to the flow rate of air in said path.

4. Apparatus for determining the concentration of carbon dioxide in air containing the same comprising;

means defining a path of flow for a sample of air to be tested,
  turbulent flow orifice means in said path of flow,
  laminar flow orifice means in said path of flow downstream from said turbulent flow orifice means,
  pressure regulator means for maintaining a constant pressure in said path downstream of said laminar flow orifice means,
  flow regulating means for varying the rate of gas flow through said flow path,
  means for sensing the pressure drop across said laminar flow orifice means,
  means for sensing the pressure drop across said turbulent flow orifice means,
  means responsive to said sensing means and connected to said flow regulating means operative to effect adjustment of the latter means to maintain the flow rate through said flow path such that the pressure drops across said orifice means remain in predetermined ratio to one another,
  means for sensing the pressure upstream from said turbulent orifice means,
  and readout means responsive to said last mentioned means for providing a signal proportional to said last mentioned pressure.

5. Apparatus for determining the concentration of carbon dioxide in air containing the same which comprises;

a sensing cell including a first, a second, and a third chamber, turbulent flow orifice means connecting said first and second chambers, laminar flow orifice means connecting said second and third chambers, said turbulent and laminar flow orifice means having substantially the same flow rate for the same pressure drops across the same, means for maintaining a predetermined constant pressure in said third chamber, supply means for supplying air to be tested to said apparatus at a second pressure greater than said predetermined pressure, adjustable valve means connecting said supply means to said first chamber for feeding a sample of air to be tested to said first chamber, a pressure sensitive servo mechanism comprising a pair of substantially parallel flexible diaphragms one of which has substantially twice the area of the other, means defining a first sealed chamber with said diaphragms forming opposite side walls of said chamber, means defining a second sealed chamber with said one diaphragm forming a side wall thereof, means defining a third sealed chamber with said other diaphragm forming a side wall thereof, conduit means connecting said first servo chamber to said sensing cell third member whereby the pressures in such chambers are equal, conduit means connecting said second servo chamber to said sensing cell second chamber whereby the pressures in such chambers are equal, conduit means connecting said third servo chamber to said sensing cell first chamber whereby the pressures in such chambers are equal, rigid means interconnecting said diaphragms at their centers whereby they must flex together, and means connecting said diaphragms to said adjustable valve means for operating the same in a predetermined manner in response to movement of said diaphragms so that as the pressure in said sensing cell second chamber decreases said valve means will be operated to decrease the rate of flow of air from said supply means, and a readout means connected to said sensing cell first chamber responsive to the pressure therein for providing a signal proportional to said last mentioned pressure.

6. Apparatus for determining the concentration of carbon dioxide in air containing the same which comprises a sensing cell including a first, a second, and a third chamber, turbulent flow orifice means connecting said first and second chambers, laminar flow orifice means connecting said second and third chambers, said turbulent and laminar flow orifice means having the same flow rate for predetermined ratios of pressure drops across such orifice means, means for maintaining a predetermined constant pressure in said third chamber, supply means for supplying air to be tested to said apparatus at a second pressure greater than said predetermined pressure, adjustable valve means connecting said supply means to said first chamber for feeding a sample of air to be tested to said first chamber, a pressure sensitive servo mechanism comprising a pair of substantially parallel flexible diaphragms one of which is of greater area than the other by a ratio equal to the ratio of the total pressure drop across said orifice to the drop across said laminar flow orifice at the same flow rate therethrough, means defining a first sealed chamber with said diaphragms forming opposite side walls of said chamber, means defining a second sealed chamber with said one diaphragm forming a side wall thereof, means defining a third sealed chamber with said other diaphragm forming a side wall thereof, conduit means connecting said first servo chamber to said sensing cell third chamber whereby the pressures in such chambers are equal, conduit means connecting said second servo chamber to said sensing cell second chamber whereby the pressures in such chambers are equal, conduit means connecting said third servo chamber to said sensing cell first chamber whereby the pressures in such chambers are equal, rigid means interconnecting said diaphragms at their centers whereby they must flex together, and means connecting said diaphragms to said adjustable valve means for operating the same in a predetermined manner in response to movement of said diaphragms so that as the pressure in said sensing cell second chamber decreases said valve means will be operated to decrease the rate of flow of air from said supply means to maintain the pressure drops across said orifice means at said predetermined ratio, and a readout means connected to said sensing cell first chamber responsive to the pressure therein for providing a signal proportional to said last mentioned pressure.

7. Apparatus for determining the concentration of carbon dioxide in air which comprises;

a sensing cell including a first, a second, and a third chamber, turbulent flow orifice means connecting said first and second chambers, laminar flow orifice means connecting said second and third chambers, said orifice means having the same flow rate for predetermined ratios of pressure drops across such orifice means, an outlet line from said third chamber, air supply means for supplying air to be tested to said apparatus, at a second pressure greater than said predetermined pressure, an inlet line connecting said air supply means to said first chamber, a pressure sensitive servo mechanism comprising a pair of substantially parallel flexible diaphragms one of which is of greater area than the other by a predetermined amount, means defining a first sealed chamber with said diaphragms forming opposite side walls of said chamber, means defining a second sealed chamber with said one diaphragm forming a side wall thereof, means defining a third sealed chamber with said other diaphragm forming a side wall thereof, conduit means connecting said first servo chamber to said sensing cell third chamber whereby the pressures in such chambers are equal, conduit means connecting said second servo chamber to said sensing cell second chamber whereby the pressures in such chambers are equal, conduit means connecting said third servo chamber to said sensing cell first chamber whereby the pressures in such chambers are equal, rigid means interconnecting said diaphragms at their centers whereby they must flex together, an adjustable valve means in one of said outlet and inlet lines, and means connecting said diaphragms to said adjustable valve means for operating the same in a predetermined manner in response to movement of said diaphragms so that as the pressure in said sensing cell second chamber changes said valve means will be operated to control the rate of flow of air through said sensing cell to maintain the pressure drop across said orifices at said predetermined ratio, and a readout means connected to one of said chambers of said sensing cell subject to changing pressure as the flow rate changes and responsive to the pressure therein for providing a signal proportional to the pressure in such chamber.

8. Orifice apparatus comprising;

a cylindrical body member having a circular, coaxial recess having a counterbore therein from one end surface, an aperture extending through a wall of said body member and providing communication with said recess adjacent the end thereof remote from said one end surface, a turbulent flow orifice defining member in said aperture, means in said recess defining a laminar flow orifice including a cup shaped tubular element having a head portion seated with said counterbore and an elongate sleeve portion of substantially smaller diameter than said head portion coaxial with said opening and extending from said head portion toward said remote recess end, a stem element within sleeve portion having a diameter less than the inner diameter of said sleeve by an amount that laminar flow is caused of a gas moving between said stem and said sleeve, wall means engaging the outer end of said head portion for fixing the same within said body member and defining with said head portion a chamber, and outlet means extending through said wall means.

9. Apparatus as set forth in claim 8 wherein said sleeve is a material having a higher coefficient of expansion than said stem.

10. Orifice apparatus comprising;

a body member defining a circular chamber, an aperture extending through a wall of said body member and providing communication with said chamber adjacent one end thereof, a turbulent flow orifice defining member in said aperture, means in said chamber defining a laminar flow orifice including a cup shaped tubular element having a head portion seated against the wall of said chamber at the end thereof opposite said one end and an elongate sleeve portion of substantially smaller diameter than said head portion extending from said head portion toward said one chamber end, a stem element within sleeve portion having a diameter less than the inner diameter of said sleeve by an amount that laminar flow is caused of a gas moving between said stem and said sleeve, wall means engaging the outer end of said head portion and defining with said head portion a chamber, and outlet means extending through said wall means.

References Cited by the Examiner
UNITED STATES PATENTS

| | | | |
|---|---|---|---|
| 1,633,352 | 6/1927 | Tate | 73—23 |
| 1,884,896 | 10/1932 | Smith | 73—23 |
| 1,922,939 | 8/1933 | Fagelston | 73—23 |
| 2,210,480 | 8/1940 | Brice | 138—41 |
| 2,310,435 | 2/1943 | Jenkins | 73—23 X |
| 2,449,067 | 9/1948 | Guillemin | 73—23 |
| 2,886,968 | 5/1959 | Johnson et al. | |
| 3,086,386 | 4/1963 | Kapff | 73—23 |

RICHARD C. QUEISSER, *Primary Examiner.*

J. FISHER, *Assistant Examiner.*

UNITED STATES PATENT OFFICE
CERTIFICATE OF CORRECTION

Patent No. 3,314,281                                             April 18, 1967

Dan R. Reece, et al.

It is hereby certified that error appears in the above numbered patent requiring correction and that the said Letters Patent should read as corrected below.

Column 6, line 42, the formula should appear as shown below instead of as in the patent:

$$\text{Pressure Drop} = \frac{A(\text{viscosity})(\text{velocity})}{(\text{width of passageway})^3}$$

column 9, line 30, for "member" read -- chamber --.

Signed and sealed this 7th day of November 1967.

(SEAL)
Attest:

EDWARD M. FLETCHER, JR.                           EDWARD J. BRENNER
Attesting Officer                                    Commissioner of Patents